United States Patent [19]
Waij et al.

[11] Patent Number: 5,379,985
[45] Date of Patent: Jan. 10, 1995

[54] VALVE

[75] Inventors: Petrus B. A. Waij, Assendelft; Petrus N. R. J. Van De Wiel, 2, NL-1674 NH, Opperdoes, both of Netherlands

[73] Assignees: V. O. F. Waij; Van De Wiel, ZG Opperdoes, Netherlands

[21] Appl. No.: 107,764

[22] Filed: Aug. 18, 1993

[30] Foreign Application Priority Data

Mar. 5, 1991 [NL] Netherlands ............... 9100393

[51] Int. Cl.[6] ............................................. F16K 1/00
[52] U.S. Cl. ........................................ 251/358; 251/331
[58] Field of Search .................... 251/356, 358, 331

[56] References Cited

U.S. PATENT DOCUMENTS

| | | | |
|---|---|---|---|
| 1,616,228 | 2/1927 | Reinecke | 251/358 |
| 2,886,284 | 5/1959 | Wheatley | 251/358 |
| 2,911,010 | 11/1959 | Lomburn | 251/331 |
| 3,081,063 | 3/1963 | Seltsam | 251/331 |
| 3,895,748 | 7/1975 | Klingenberg | |
| 4,715,578 | 12/1987 | Seltzer | 251/331 |

FOREIGN PATENT DOCUMENTS

| | | |
|---|---|---|
| 0402535 | 12/1990 | European Pat. Off. |
| 587897 | 1/1925 | France |
| 2221669 | 10/1974 | France |
| 1600865 | 2/1972 | Germany |
| 2138544 | 10/1984 | United Kingdom |

OTHER PUBLICATIONS

Patent Abstracts of Japan, vol. 10, No. 155 for Japanese Patent Publication 61-10179, patent published Jan. 17, 1986.

*Primary Examiner*—A. Michael Chambers
*Attorney, Agent, or Firm*—Bachman & LaPointe

[57] ABSTRACT

Valve comprising a valve stem and a valve disc. The peripheral edge of the valve disc in the closed position comes to rest in a sealing manner against the valve seat of the corresponding valve housing. Between this sealing peripheral edge and the valve stem the valve disc is partially made of elastically yielding material. The position of the valve stem guide is such that it is possible to move the valve further in the direction of closure after the peripheral edge rests against the valve seat. This means that a vacuum can be created with the aid of the valve according to the invention. Such a vacuum can be used in filling devices for drinks. The nozzle in this case is made of a relatively flexible material which closes when vacuum is created. In this way after-dripping of drinks in, for example, juice packs can be avoided.

8 Claims, 4 Drawing Sheets

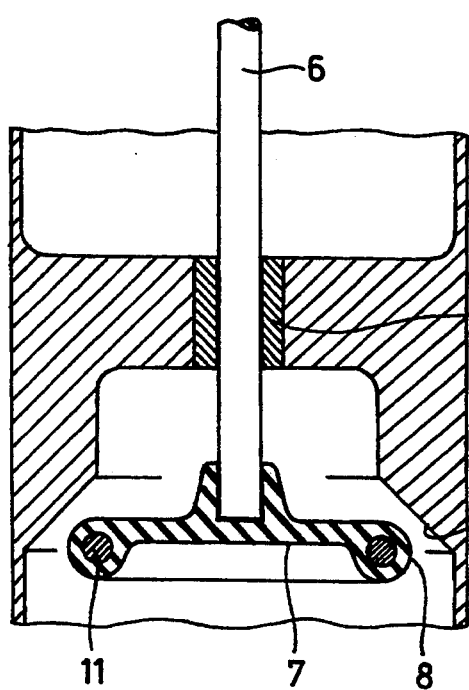
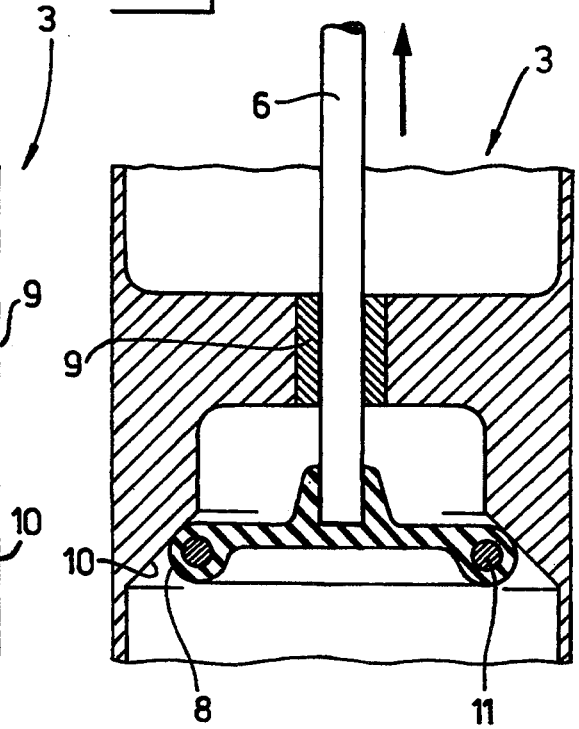
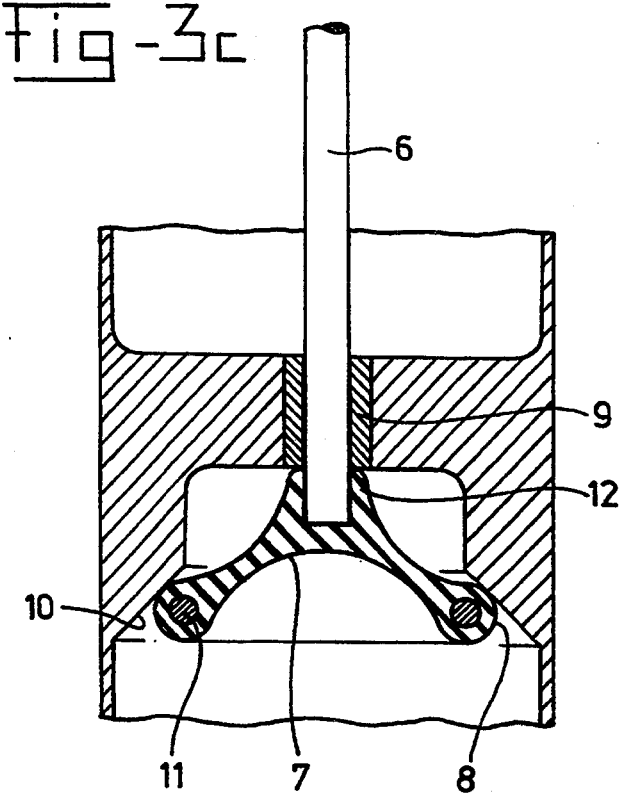

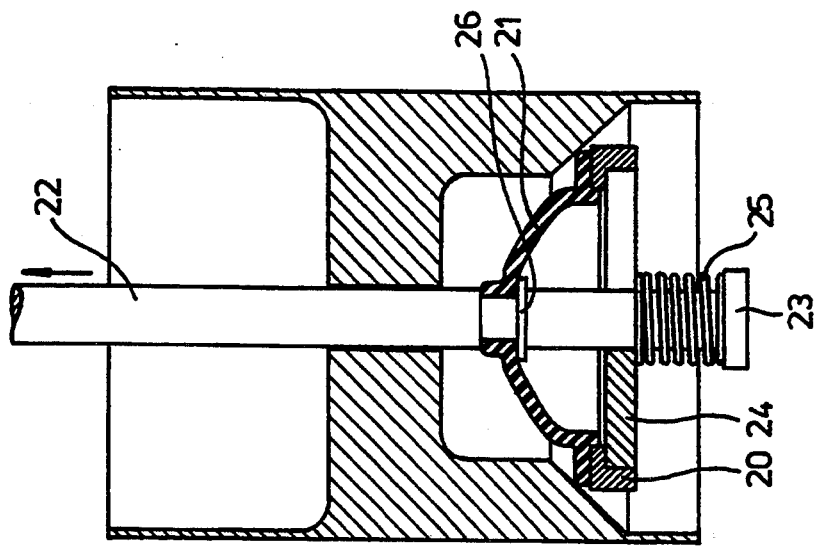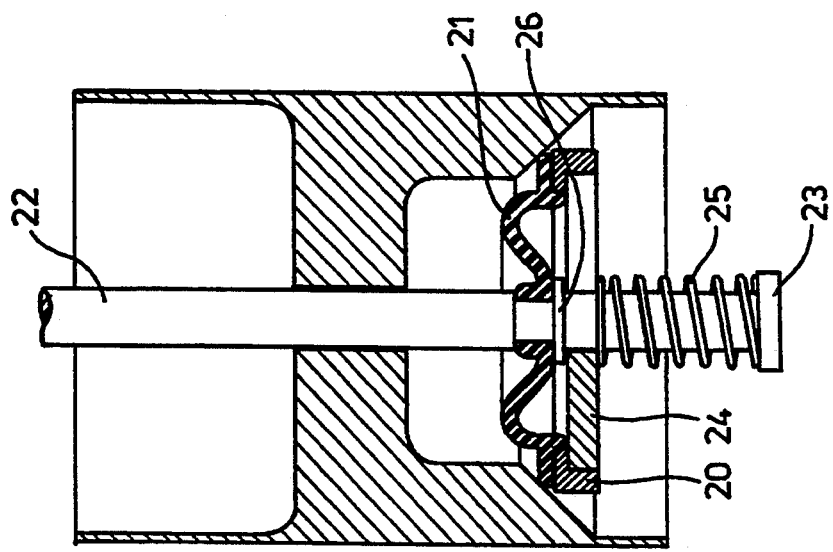

VALVE

The invention relates to a valve comprising a valve stem and a valve disc, with a peripheral edge arranged to seal in conjunction with a valve seat.

Such a valve is known from FR-A-587,897. In this case the peripheral edge of the valve disc is made elastic, in order to ensure That it can adapt to the valve seat. In a further embodiment the valve disc made slightly elastic, in order to provide an optimum seal with the valve seat through slight deformation. In the case of filling devices, and in particular filling devices for drinks packs, there is the problem of dripping from the filling aperture after the actual filling has taken place. Apart from the unhygienic aspect of such slight soiling, in particular in the case of packs which subsequently have to be sealed by means of, for example, heat, the disadvantage is that the sealing surfaces are soiled by the dripping material, so that correct sealing can no longer be guaranteed. Nowadays, drinks in particular are marketed increasingly in cartons which are provided on the inside with a plastic layer and are sealed by applying heat to these cartons.

In the state of the art it is known to eliminate this problem by using nozzle orifices which react vacuum. This means that when the actual filling operation is completed vacuum is created in the outlet of the valve assembly, with the result that the orifice flaps shut, the last droplets are withdrawn, end the liquid flow column is retained. The creation of vacuum currently takes place in a relatively complex manner. A method is described in British Patent Application 2,044,408 and involves displacing a membrane over a relatively large distance, in order to produce a vacuum. A vacuum device working with a membrane is described in U.S. Pat. No. 3,895,748. In this case a part of the wall of the outlet channel after the metering valve is replaced by a membrane to which the pressure can be directed the side facing away from the channel, with the result that a vacuum can be created in the said channel.

All these proposed designs have the disadvantage that a special control is necessary to achieve the vacuum. Besides, the devices mentioned here are relatively complex, which reduces operating reliability. Cleaning, which is important in the foods industry, also constitutes a problem, owing to the large number of parts. During the relatively large displacements, described in the above-mentioned British application, there is also a risk of foaming in the case of certain liquids.

The object of the invention is to avoid these disadvantages.

This object is achieved in the case of a valve of the type described above by the present invention.

After the peripheral edge comes to rest on the valve seat, on further displacement of the valve stem in the direction of closure the part between the valve stem and the peripheral edge, which is elastically deformable, will be displaced, with the result that a partial vacuum is created in the outlet channel. On account of the relatively small displacement, there is no risk of foaming. It is clear that such a design, because it is integral with the valve, is simple to achieve and is particularly easy to replace and to clean, while providing great operating reliability. The adaptations to the plant are also minimal. The creation of the vacuum means that no dripping takes place after filling. Through controlling the movement of the valve stem, both the closing movement of the valve and the extent to which the vacuum is created can be controlled.

According to an advantageous embodiment, the peripheral edge is made of a relatively rigid material. According to a further proposal, the peripheral edge is also made of an elastically deformable material, but it is provided with reinforcements. These reinforcements can be either a thickened part or an inserted, more rigid material.

According to another advantageous embodiment of he invention, additional means are present for moving back the elastically deformable material. In particular in the case of movement of large volumes, it is difficult to make the elastically deformable material such that, on the one hand, it provides a seal and, on the other, with controllable ingoing elastic deformation it is sufficiently guaranteed that the return movement is carried out when the tension is released. These additional means can also determine the form of the valve when a fluid is circulating.

The invention also relates to a valve assembly, comprising 8 valve housing with an opening bounded by a valve seat, and valve stem guide means and a valve, as described above. According to the invention, the valve stem guide means are characterised in that they are fitted in such a way that after the peripheral disc lies on the valve seat they permit a further movement of the valve in the direction of closure. The vacuum described above can be created in this way.

As described above, such a valve assembly can be used in an advantageous manner for a filling device for filling drinks packs provided with a vacuum-closing nozzle or a nozzle working in another way to retain liquid, such as a screen or screen packet.

The invention will be explained in greater detail below with reference to an example of an embodiment shown in the drawing, in which:

FIGS. 3a, 3b and 3c show the device according FIG. 2 with the valve according to the invention in different positions:

FIG. 4 shows a top view of the device according to FIG. 3;

FIGS. 5a and 5b show a further modified embodiment of the invention in two positions.

Figure 1:
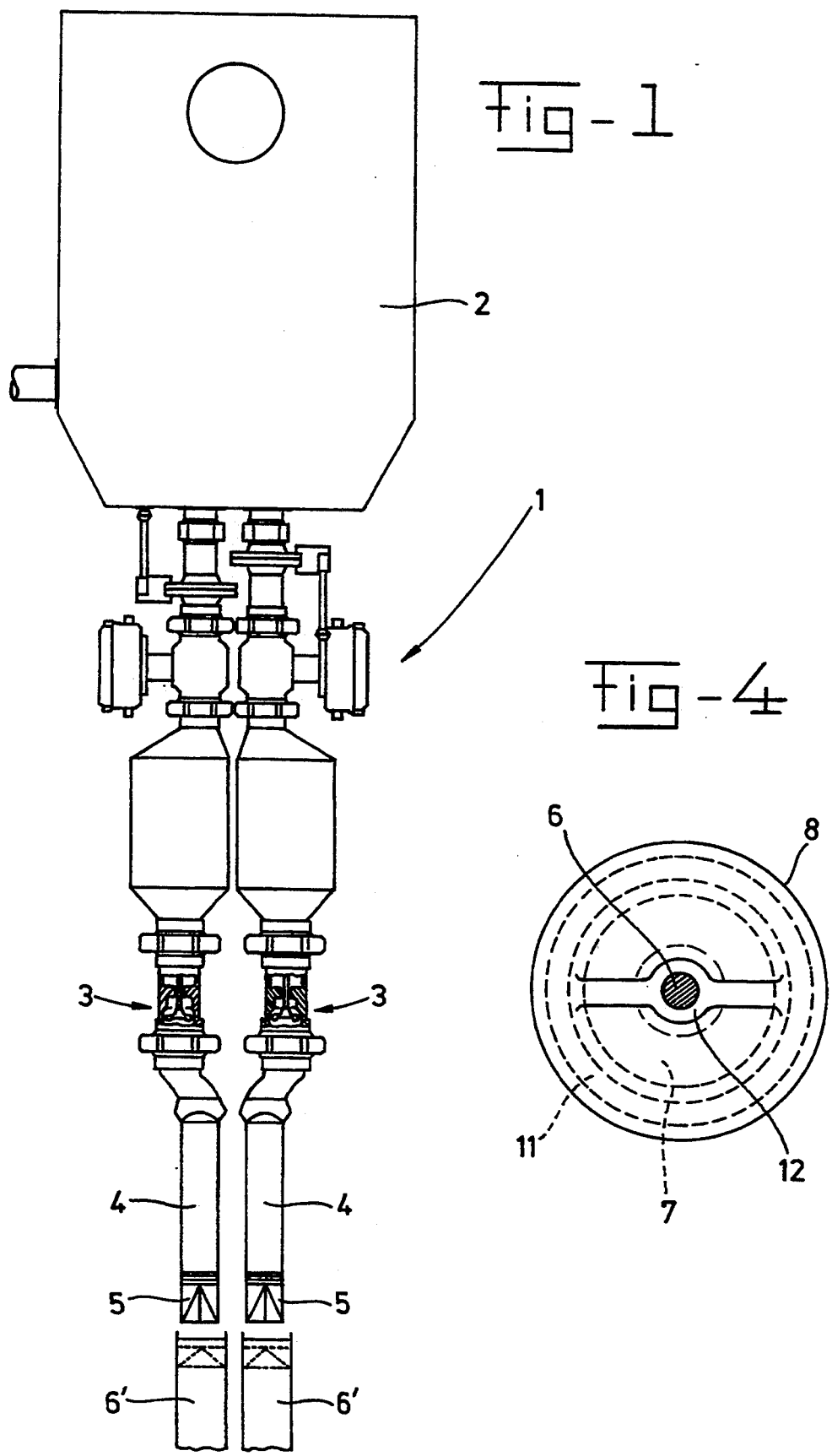
FIG. 1 shows a part of a filling plant for drinks packs.

In FIG. 1 a plant for filling drinks packs is indicated by 1. It consists of a stock container 2. By way of various shut-off valves not shown in detail, the liquid is taken into the valve assembly 3, inside which there is a valve. Valve assembly 3 is connected to an outlet channel 4 to which a vacuum-operated nozzle 5 is connected. Below that is a Juice pack 6', which is shown only schematically in the open position. It is important that after the closure of valve assembly 3 no liquid should drip at nozzle 5, because during the movement of pack 6 liquid residues could fall onto the ribs which are to be sealed, with the result that it could no longer be guaranteed that the seal which is generally achieved by heat would meet the required standards. FIG. 1 shows a double filling plant.

Figure 2:
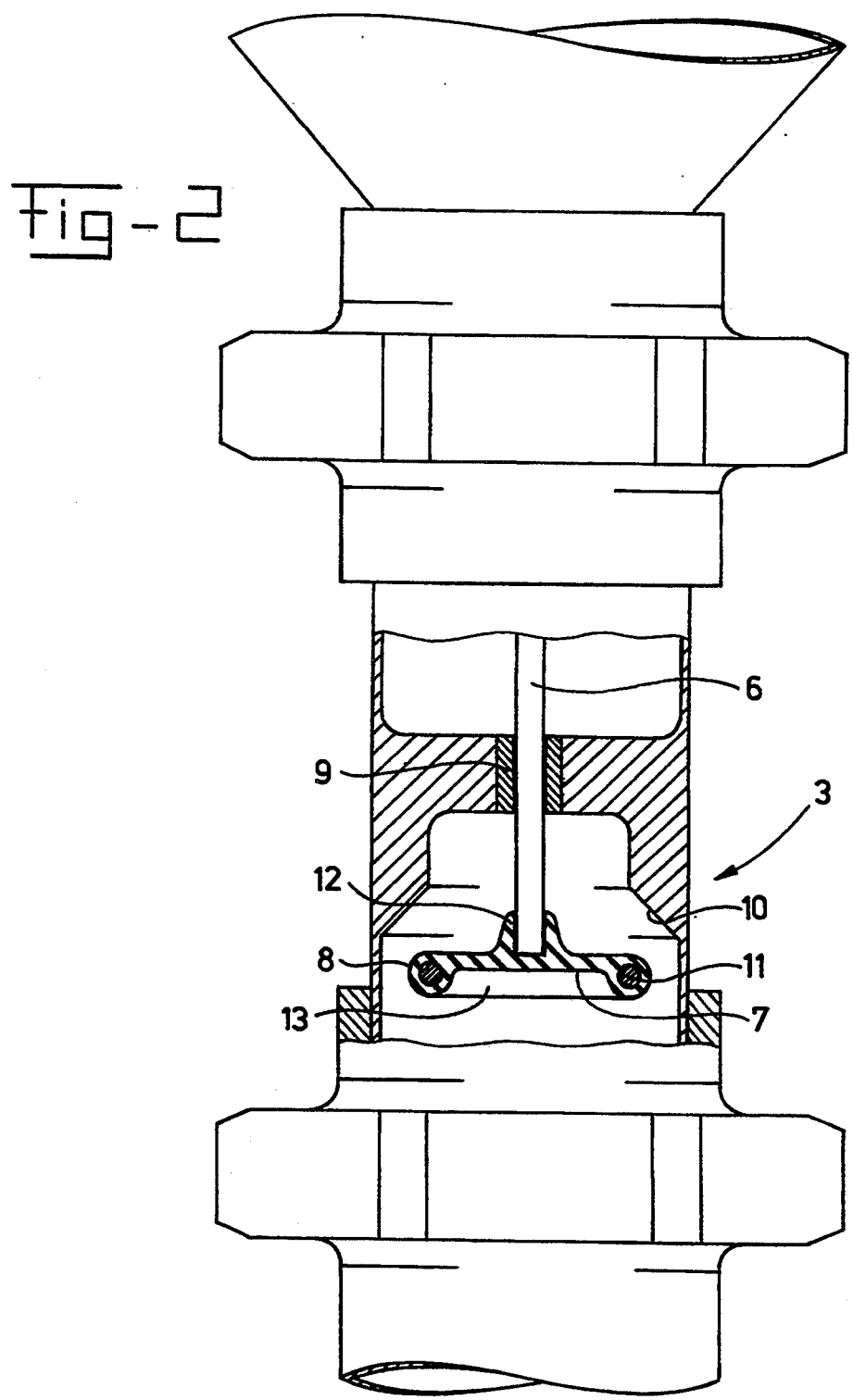
FIG. 2 shows a detail of the device according to FIG. 1.

FIG. 2 shows a detail of the device according to FIG. 1, and more particularly the valve assembly 3. Further illustrations of it are shown in FIGS. 3a, 3b, 3c and 4. It can be seen that the valve assembly is composed of a valve stem 6 provided with a valve disc 7 with a peripheral edge 8. The valve housing comprises a valve stem guide 9 and a valve seat 10. Valve disc 7 is made of en elastically deformable material, such as a rubber elastic material.

The peripheral edge 8 of the valve disc 7 is made of the same material, but is provided with a reinforcement ring, for example a stainless steel ring 11. The closing action of the valve is shown in FIGS. 3b and 3c, from the open position shown in FIG. 3a. It can be seen that after the peripheral edge 8 rests on valve seat 10 a seal is achieved. Through the elastic nature of valve disc 7, it is, however, possible to move valve stem 6 further, with the result that the position according to FIG. 3c is reached. On movement from the position in FIG. 3b to the position in FIG. 3c a vacuum will be created, which vacuum is sufficient to close nozzle 5 and to prevent dripping. This vacuum is also able to retain the liquid column in the outlet channel. With the device according to the present invention no friction movement is carried out between the peripheral edge of the valve disc and the valve seat 10. This means that it is possible to use fluids with poor lubricating properties such as, for example, buttermilk in this filling device.

The valve can also be provided with a rubber elastic material containing a reinforcement ring. Thickened parts can be produced on the rubber elastic material, in order to increase its service life.

Although the control of the valve stem 6, 15 is not shown above, it must be understood that it can be achieved by any method known in the state of the art. In particular, it is conceivable to operate it in a controlled manner by electromagnetic means so that, in addition to a controlled closing movement of the valve, the vacuum can also be created in a controlled manner. The control of the valve can be made time-dependent and/or quantity-dependent. Using electronic devices for controlling the valve, it is possible to achieve the desired closing behaviour after the decision to close the valve. It is also possible in this way to open the valve in controlled conditions. Safety devices can also be built in, if desired, in order to prevent malfunctioning.

FIG. 5 shows schematically a detail of a further embodiment of the invention. The peripheral edge of the valve disc 20 in this case consists of a metal part on which the elastically deformable rubber part 21 is fitted. This elastically deformable part is connected at the other side to valve stem 22. Said valve stem 22 is provided with an extension with a stop 23 at the end. A spring 25 is fitted between this stop 23 and cross bridge 24, which is provided between two parts of valve disc 20 lying opposite each other. Valve stem 22 is accommodated so that it can slide in an opening of cross bridge 24. Spring 25 tries to drive elastically deformable part 21 into the position shown on the left in FIG. 5a. The situation where the vacuum is being created is shown in FIG. 5b. In this way less high standards can be set for the return characteristic of the elastically deformable part 21, so that a greater "pump stroke" can be carried out, end it is also ensured that, starting from the position shown in FIG. 5b on removal of the pulling force on valve stem 22, the position of FIG. 5a is reached again.

Although the invention is described above with reference to a preferred embodiment, it must be understood that numerous modifications can be made to it without going beyond the scope of the present application.

For example, it is possible to take away the reinforcement ring 11 and to obtain the desired deformation characteristic by controlling the thickness and/or the properties of the material used for the valve disc. It is possible here for the peripheral edge to carry out a movement relative to the valve seat when vacuum is being created. The materials from which the various parts described above are made can be any materials known in the state of the art.

We claim:

1. A valve, comprising:
   a valve stem;
   a valve seat; and
   a valve disc being displaceable between an open and closed position and having a unattached peripheral edge comprised of a relatively rigid material arranged to seal in conjunction with the valve seat, the valve disc comprising a part of deformable material positioned between the valve stem and the peripheral edge such that the peripheral edge is resiliently displaceable relative to the valve stem, wherein the part of deformable material has a resiliency such that the valve stem can be displaced between at least two retracted closed positions while the peripheral edge remains substantially stationary including a first less retracted position wherein a first volume is defined by the peripheral edge, the part of deformable material, and the valve stem and a second more retracted position wherein a second volume is defined by the peripheral edge, the part of deformable material and the valve stem, wherein the second volume is substantially smaller than the first volume.

2. The valve according to claim 1, wherein the peripheral edge is formed from a deformable material and includes reinforcement means.

3. The valve according to claim 2, wherein the reinforcement means comprises a thickened part.

4. The valve according to claim 2, wherein the reinforcement means comprises a part formed from a material which is more rigid than the deformable material.

5. The valve according to claim 1, further including means for moving back the elastically deformable material.

6. The valve according to claim 5, wherein the means for moving back comprises a spring means.

7. The valve according to claim 1, further including a valve guide and stop means for engaging the valve guide located on the valve stem.

8. A filling device for filling drink packs, comprising:
   a valve, including:
      a valve stem;
      a valve seat;
      a valve disc being displaceable between an open and closed position and having an unattached peripheral edge comprised of a relatively rigid material arranged to seal in conjunction with the valve seat, the valve disc comprising a part of deformable material positioned between the valve stem and the peripheral edge such that the peripheral edge is resiliently displaceable relative to the valve stem, wherein the part of deformable material has a resiliency such that the valve stem can be displaced between at least two retracted closed positions while the peripheral edge remains substantially stationary including a first less retracted position wherein a first volume is defined by the peripheral edge, the part of deformable material, and the valve stem and a second more retracted position wherein a second volume is defined by the peripheral edge, the part of deformable material and the valve stem, wherein the second volume is substantially smaller than the first volume; and a valve outlet;
   means for controlling the movement of the valve which is connected by a vacuum closing nozzle device to the valve outlet.

* * * * *